(12) United States Patent
Hall et al.

(10) Patent No.: US 7,583,085 B2
(45) Date of Patent: Sep. 1, 2009

(54) DOWNHOLE SENSOR ASSEMBLY

(76) Inventors: David R. Hall, 2185 S. Larsen Pkwy., Provo, UT (US) 84606; Paula Turner, 2185 S. Larsen Pkwy., Provo, UT (US) 84606

( * ) Notice: Subject to any disclaimer, the term of this patent is extended or adjusted under 35 U.S.C. 154(b) by 0 days.

(21) Appl. No.: 12/037,803

(22) Filed: Feb. 26, 2008

(65) Prior Publication Data

US 2008/0264624 A1 Oct. 30, 2008

Related U.S. Application Data

(63) Continuation-in-part of application No. 11/776,484, filed on Jul. 11, 2007, and a continuation-in-part of application No. 11/776,447, filed on Jul. 11, 2007.

(60) Provisional application No. 60/914,619, filed on Apr. 27, 2007.

(51) Int. Cl.
*G01V 3/00* (2006.01)
(52) U.S. Cl. .................................... 324/338
(58) Field of Classification Search .................. 324/338
See application file for complete search history.

(56) References Cited

U.S. PATENT DOCUMENTS

| 4,785,247 | A | 11/1988 | Meador |
|---|---|---|---|
| 4,933,640 | A | 6/1990 | Kuckes |
| 4,980,643 | A | 12/1990 | Gianzero |
| 5,045,795 | A | 9/1991 | Gianzero |
| 5,081,419 | A | 1/1992 | Meador |
| 5,089,779 | A | 2/1992 | Rorden |
| 5,095,272 | A | 3/1992 | Sinclair |
| 5,428,293 | A | 6/1995 | Sinclair |
| 5,442,294 | A | 8/1995 | Rorden |
| 5,448,227 | A | 9/1995 | Orban |
| 5,594,343 | A | 1/1997 | Clark |
| 5,606,260 | A | 2/1997 | Giordano |
| 6,068,394 | A | 5/2000 | Dublin |
| 6,100,696 | A | 8/2000 | Sinclair |
| 6,163,155 | A | 12/2000 | Bittar |
| 6,191,586 | B1 | 2/2001 | Bittar |
| 6,218,842 | B1 | 4/2001 | Bittar |
| 6,359,438 | B1 | 3/2002 | Bittar |
| 6,476,609 | B1 | 11/2002 | Bittar |
| 6,538,447 | B2 | 3/2003 | Bittar |
| 6,577,129 | B1 | 6/2003 | Thompson |
| 6,586,939 | B1 | 7/2003 | Fanini |
| 6,667,620 | B2 | 12/2003 | Homan |
| 6,677,756 | B2 | 1/2004 | Fanini |
| 6,680,613 | B2 | 1/2004 | Rosthal |
| 6,768,407 | B2 | 7/2004 | Kohda |
| 7,046,009 | B2 | 5/2006 | Itskovich |

(Continued)

*Primary Examiner*—Reena Aurora
(74) *Attorney, Agent, or Firm*—Tyson J. Wilde; Jad A. Mills

(57) ABSTRACT

In one aspect of the invention, a sensor assembly for incorporation into a downhole tool string comprises at least one sensor adapted to detect changes in magnetic flux proximate a first portion of the downhole tool string. A second portion of the downhole tool string comprises a characteristic that interferes with a magnetic reading of the at least one sensor. At least one magnetic focusing array is disposed on an outer diameter of the tool string, and the at least one magnetic focusing array reduces an effect on the sensor of the interfering characteristic of the second portion.

20 Claims, 13 Drawing Sheets

U.S. PATENT DOCUMENTS

| | | |
|---|---|---|
| 7,098,657 B2 | 8/2006 | Guilhamat |
| 7,098,858 B2 | 8/2006 | Bittar |
| 7,138,897 B2 | 11/2006 | Minerbo |
| 7,141,981 B2 | 11/2006 | Folberth |
| 7,150,316 B2 | 12/2006 | Itskovich |
| 7,193,420 B2 | 3/2007 | Chen |
| 7,212,132 B2 | 5/2007 | Gao |
| 2004/0104794 A1 | 6/2004 | Kohda |

DOWNHOLE SENSOR ASSEMBLY

CROSS REFERENCE TO RELATED APPLICATIONS

This application is a continuation-in-part of U.S. patent application Ser. No. 11/776,484 which was filed on Jul. 11, 2007 and is a continuation-in-part of U.S. patent application Ser. No. 11/776,447 filed on Jul. 11, 2007 and entitled Externally Guided and Directed Field Induction Resistivity Tool. U.S. patent application Ser. No. 11/776,447 is a continuation-in-part of Provisional U.S. Patent Application No. 60/914,619 filed on Apr. 27, 2007 and entitled Resistivity Tool. All of the above mentioned references are herein incorporated by reference for all that they contain.

BACKGROUND OF THE INVENTION

The present invention relates to the field of downhole oil, gas, and/or geothermal exploration and more particularly to the field of detecting magnetic flux proximate a downhole tool string or drill string employed in such exploration.

For the past several decades, engineers have worked to develop apparatus and methods to effectively obtain information about downhole formations and the position and inclination of tool strings, especially during the drilling process. Various sensors and methods have been developed to obtain and transfer information to the surface.

U.S. Pat. Nos. 5,170,566 to Fowler et al., 4,623,842 to Bell et al., and 4,349,781 to Vozoff, each of which is herein incorporated by reference for all that it contains, describe sensors adapted to detect changes in magnetic fields. U.S. Pat. No. 6,216,533 to Woloson et al., herein incorporated by reference for all that it contains, describes a magnetic sensor for use in downhole applications. U.S. Pat. Nos. 5,466,614 to Yokosawa et al., 5,187,438 to Alcouffe et al., and 5,475,306 to Ludeke et al., each of which is herein incorporated by reference for all that it contains, describe devices for shielding magnetic sensors.

U.S. Pat. Nos. 7,265,649 to Hall et al., and 7,301,429 to Hall et al., each of which is herein incorporated by reference for all that it contains, disclose inductive downhole resistivity tools adapted to detect magnetic flux proximate a tool string.

BRIEF SUMMARY OF THE INVENTION

In one aspect of the invention, a sensor assembly for incorporation into a downhole tool string comprises at least one sensor adapted to detect changes in magnetic flux proximate a first portion of the downhole tool string. A second portion of the downhole tool string comprises a characteristic that interferes with a magnetic reading of the at least one sensor. At least one magnetic focusing array is disposed on an outer diameter of the tool string, and the at least one magnetic focusing array reduces an effect on the sensor of the interfering characteristic of the second portion. The second portion may comprise a magnetically conductive material and the first portion may comprise a magnetically insulating material. A longitudinal length of the first portion may be less than 18 feet.

The first portion of the tool string may be disposed intermediate the second portion and a third portion. The assembly may comprise a first focusing array disposed proximate a junction of the first and second portions, and a second focusing array disposed proximate a junction of the first and third portions. The second and third portions may each comprise a magnetically conductive material. In some embodiments the first and second focusing arrays may each comprise a signal intensity that is independently adjustable.

The at least one focusing array may comprise an augmented magnetic field side. The focusing array may be disposed in an annular radial recess in an outer diameter of the first portion. In some embodiments, at least one focusing array may be disposed on the second portion of the tool string. In some embodiments the at least one focusing array may be a Halbach array.

The focusing array may comprise a plurality of magnetic units, and each unit may comprise a magnetic field orientation. The focusing array may comprise at least one induction coil. A ring of magnetically conductive and electrically insulating material may be disposed intermediate the at least one induction coil and an outer wall of the first portion. The induction coil may comprise between 1 and 60 coil turns. A first coil turn of the induction coil may generally define a plane that intersects a central axis of the tool string at an angle between 0 and 90 degrees.

The focusing array may comprise a plurality of induction coils. Each of the plurality of induction coils may be wound about at least one magnetic core. At least one of the plurality of induction coils may be adapted to switch between a series and parallel connection with at least one other coil of the plurality of induction coils.

The sensor may be disposed within the outer diameter of the first portion. The sensor may comprise at least one magnetometer, fluxgate magnetometer, scalar magnetometer, vector magnetometer, superconducting quantum interference device, magnetograph, rotating coil magnetometer, hall effect magnetometer, proton precession magnetometer, Overhauser magnetometer, Cesium vapor magnetometer, Spin-exchange-relaxation-free atomic magnetometer, or combinations thereof. The sensor may comprise three orthogonal vector magnetometers. In some embodiments the sensor assembly may be in communication with a downhole network.

DETAILED DESCRIPTION OF THE INVENTION AND THE PREFERRED EMBODIMENT

Figure 1:
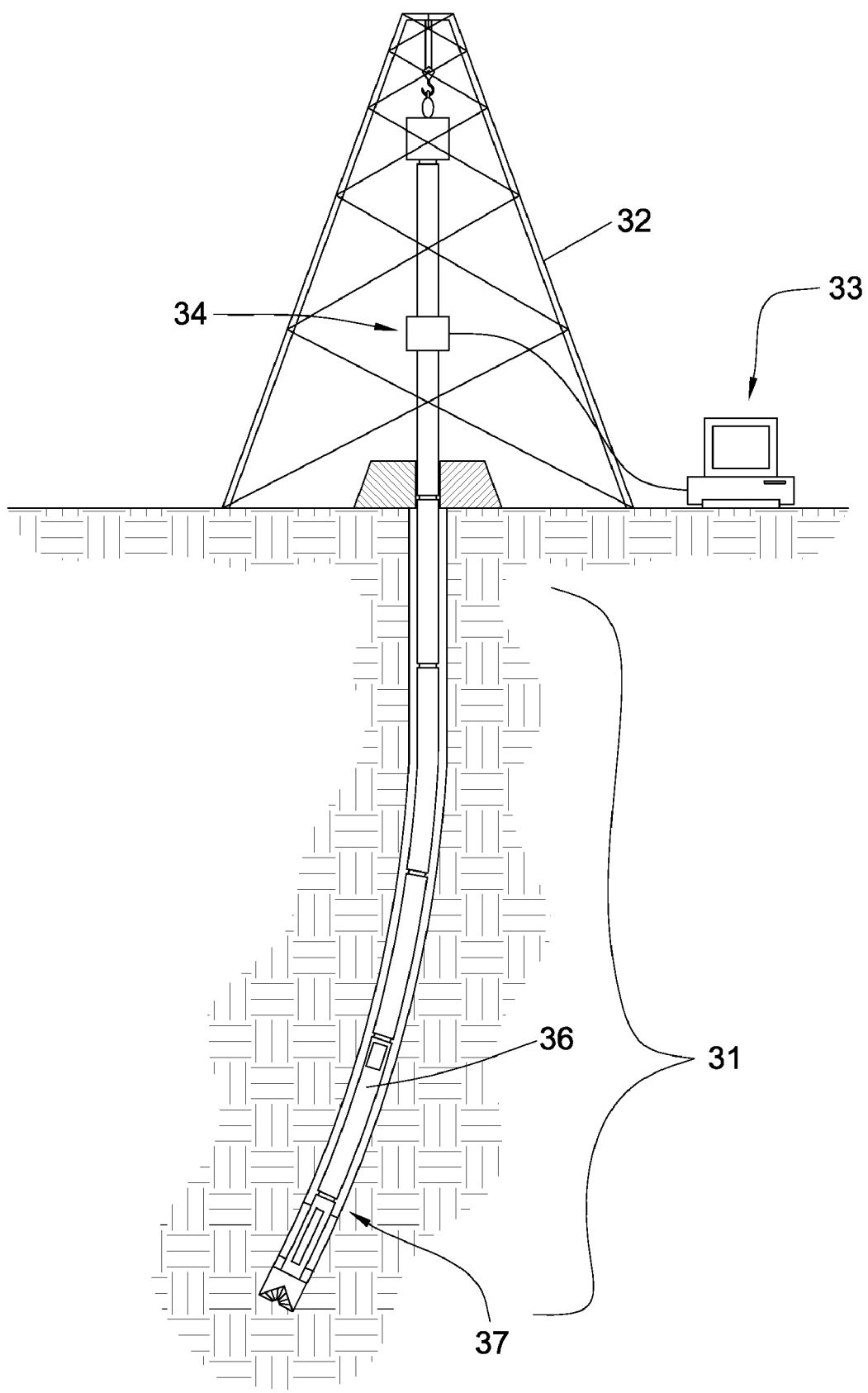
FIG. 1 is a cross-sectional diagram of an embodiment of a downhole tool string.

Referring now to FIG. 1, a downhole tool string 31 may be suspended by a derrick 32. The tool string may comprise one or more downhole components 36, linked together in a tool string 31 and in communication with surface equipment 33 through a downhole network. Having a network in the tool string 31 may enable high-speed communication between each device connected to it and facilitate the transmission and receipt of data between sensors, energy sources, and energy receivers.

The tool string 31 or surface equipment 33 may comprise an energy source or multiple energy sources. The energy source may transmit electrical current to one or more downhole components 36 on the bottom hole assembly 37 or along the tool string 31. In some embodiments of the invention, one or more downhole component 36 may comprise sensors. These sensors may sense magnetic flux, gamma rays, radioactive energy, resistivity, torque, pressure, or other drilling dynamics measurements or combinations thereof from the formation being drilled. Many combinations of downhole components 36 in a tool string 31 may be compatible with the present invention.

Data may be transmitted along the tool string 31 through techniques known in the art. A preferred method of downhole data transmission using inductive couplers disposed in tool joints is disclosed in the U.S. Pat. No. 6,670,880 to Hall, et al, which is herein incorporated by reference for all it discloses. An alternate data transmission path may comprise direct electrical contacts in tool joints such as in the system disclosed in U.S. Pat. No. 6,688,396 to Floerke, et al., which is herein incorporated by reference for all that it discloses. Another data transmission system that may also be adapted for use with the present invention is disclosed in U.S. Pat. No. 6,641,434 to Boyle, et al., which is also herein incorporated by reference for all that it discloses. In some embodiments, of the present invention alternative forms of telemetry may be used to communicate with the downhole components 36, such as telemetry systems that communicate through the drilling mud or through the earth. Such telemetry systems may use electromagnetic or acoustic waves. The alternative forms of telemetry may be the primary telemetry system for communication with the tool string 31 or they may be back-up systems designed to maintain some communication if the primary telemetry system fails. A data swivel 34 or a wireless top-hole data connection may facilitate the transfer of data between components 36 of the rotatable tool string 31 and the stationary surface equipment, such as a control module 33.

Preferably the downhole tool string 31 is a drill string. In other embodiments the downhole tool string 31 is part of a production well. In some embodiments, the sensory assembly may be deployed on a wireline tool. Control equipment may be in communication with the downhole tool string components 36 through an electrically conductive medium. For example, a coaxial cable, wire, twisted pair of wires or combinations thereof may travel from the surface to at least one downhole tool string component. The medium may be in inductive or electrical communication with each other through couplers positioned so as to allow signal transmission across the connection of the downhole component and the tool string. The couplers may be disposed within recesses in either a primary or secondary shoulder of the connection or they may be disposed within inserts positioned within the bores of the drill bit assembly and the downhole tool string component. As the control equipment receives information indicating specific formation qualities, the control equipment may then change drilling parameters according to the data received to optimize drilling efficiency. Operation of the drill string 31 may include the ability to steer the direction of drilling based on the data.

Figure 2:
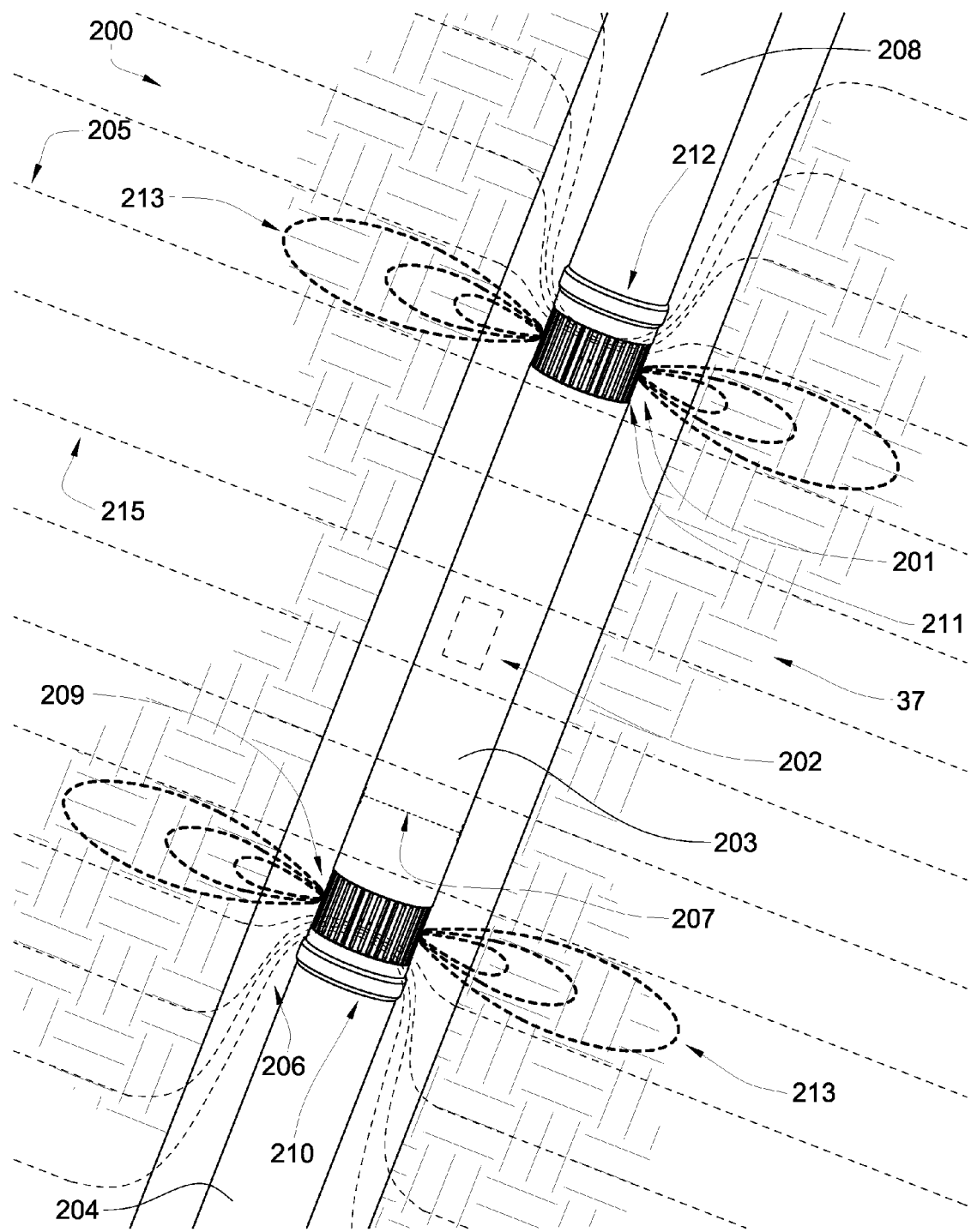
FIG. 2 is a perspective diagram of an embodiment of a sensor assembly.

Referring now to FIG. 2 an embodiment of a sensor assembly 200 is shown incorporated into a downhole tool string 31. The sensor assembly 200 comprises at least one sensor 202 adapted to detect changes in magnetic flux proximate a first portion 203 of the tool string 31. Preferably the sensor 202 is a magnetometer disposed in the center of the tool string component 36. A second portion 204 of the tool string 31 is disposed proximate the first portion 203 and comprises a characteristic that interferes with a magnetic reading of the at least one sensor 202. The second portion 204 may comprise a magnetically conductive material and the first portion may comprise a magnetically insulating material.

The interfering characteristic of the second portion 204 may be magnetic conductivity. The magnetic conductivity of the second portion 204 may impact the earth's magnetic field proximate the first portion 203. In FIG. 2 magnetic field lines 205 represent the earth's magnetic field. The magnetic conductivity of the second portion 204 may cause a path alteration 206 in at least a portion of the earth's magnetic field and/or an increase in magnetic flux from the earth's magnetic field proximate the tool string 31. A path alteration 206 is shown represented by some of the magnetic field lines 205 in FIG. 2. The path alteration 206 also results in an increased magnetic flux as represented by an increased density of magnetic field lines 205 proximate the path alteration 206. Detection of magnetic flux proximate the first portion 203 generated by the earth's natural magnetic field may be used to determine the orientation or location of the sensor 202 with respect to the surface of the planet. This orientation or location may be communicated to a steering assembly and/or to the surface through a downhole network. The sensor assembly 200 may be in communication with the downhole network and allow transfer of this information, as well as other information and/or power.

Any interference with a natural magnetic field of the earth proximate the sensor 202 may adversely impact the accuracy of orientation measurements. Such interference with the natural magnetic field of the earth may be represented by a path alteration 206 or by an increase in field line density. Such changes may result in an incorrect determination of orientation or location of the tool string 31 because the magnetic flux detected by the sensor 202 may not reflect the natural magnetic field of the earth A natural path magnetic field line 215 represents the earth's magnetic field in relation to the sensor 202 when the field is not altered by magnetically conductive material proximate the sensor 202. The prior art discloses embodiments of magnetic sensors disposed in nonmagnetic collars. The nonmagnetic material required for these collars is very expensive and the collars must comprise specific minimum lengths depending on formation conditions and the latitude position of the drilling operation. In order to enhance the ability of the sensor 202 to determine the actual orientation of the tool string 31 and decrease the required length of non-magnetic collars proximate such sensors 202, at least one magnetic focusing array 201 is disposed on an outer diameter 207 of the tool string 31 and reduces an effect on the sensor 202 of the interfering characteristic of the second portion 204.

In FIG. 2, the first portion 203 is a nonmagnetic collar and is disposed intermediate the second portion 204 and a third portion 208. The sensor assembly 200 comprises a first focusing array 209 disposed proximate a first junction 210 between the first and second portions 203, 204. The sensor assembly 200 also comprises a second focusing array 211 disposed proximate a second junction 212 between the first and third portions 203, 208. The second and third portions 204, 208 each comprise a magnetically conductive material that causes a path alteration 206 and an increase in magnetic flux proximate the first portion 203. The first and second focusing arrays 209, 211 may reduce the effect of the magnetically conductive materials on the magnetic flux proximate the sensor 202 by restricting the path alteration 206 and increased field line density from impacting the earth's magnetic field immediately proximate the sensor 202.

The magnetic field closest to the sensor 202 may be shielded by the focusing arrays 209, 211 from the effects of the second and third portions 204, 208 and this shielding may allow the sensor 202 to correctly correlate the changes in magnetic flux it detects proximate the first portion 203 with the true orientation or location of the tool string 31. In the present embodiment the focusing arrays 209, 211 shield the sensor 202 by generating an augmented inductive magnetic field 213 and projecting the augmented field 213 radially outward from the outer diameter 207 of the tool string 31.

Figure 3:
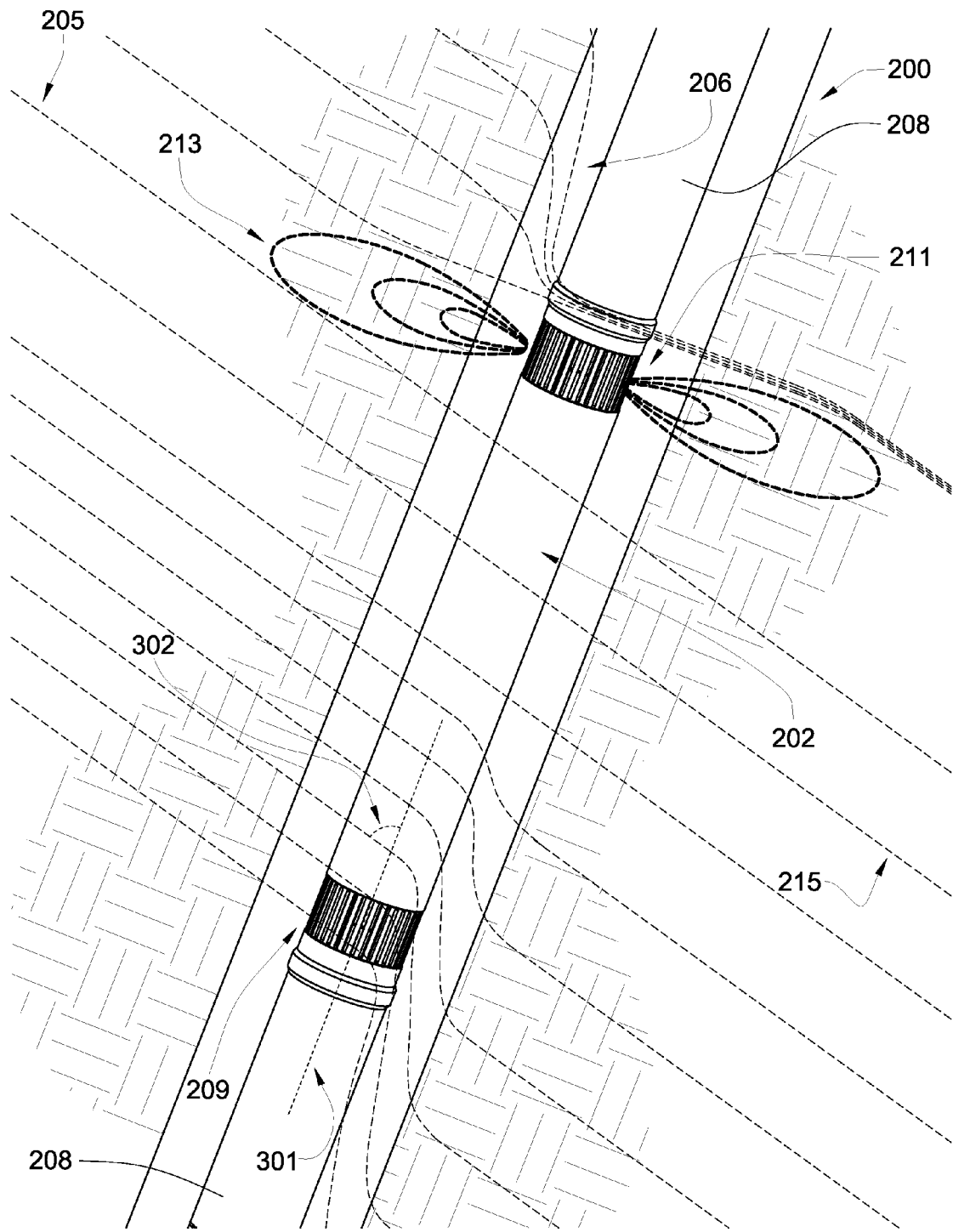
FIG. 3 is a perspective diagram of another embodiment of a sensor assembly.

In FIG. 2 the natural path magnetic field lines 215 are orthogonal to a central axis of the first portion 203 of the tool string 31. Referring now to FIG. 3, the natural path magnetic field lines 215 intersect with the central axis 301 of the first portion 203 of the tool string 31 at a non-orthogonal angle 302. The magnetic field in FIG. 3 proximate the third portion 208 also comprises a path alteration 206 and an increased magnetic flux as a result of the magnetic conductivity of the second portion 204. The second focusing array 211 reduces the effect of the path alteration 206 and increased magnetic flux on the sensor 202. In some embodiments the first and second focusing arrays 209, 211 may each comprise an adjustable signal intensity. The adjustable signal intensity may be altered to correspond with requisite parameters including inclination of the tool string 31, latitude of the drill string, magnetic properties of the formation, changes in the planetary magnetosphere, and combinations thereof. In FIG. 3 the first and second focusing arrays 209, 211 comprise different signal intensities.

Figure 4:
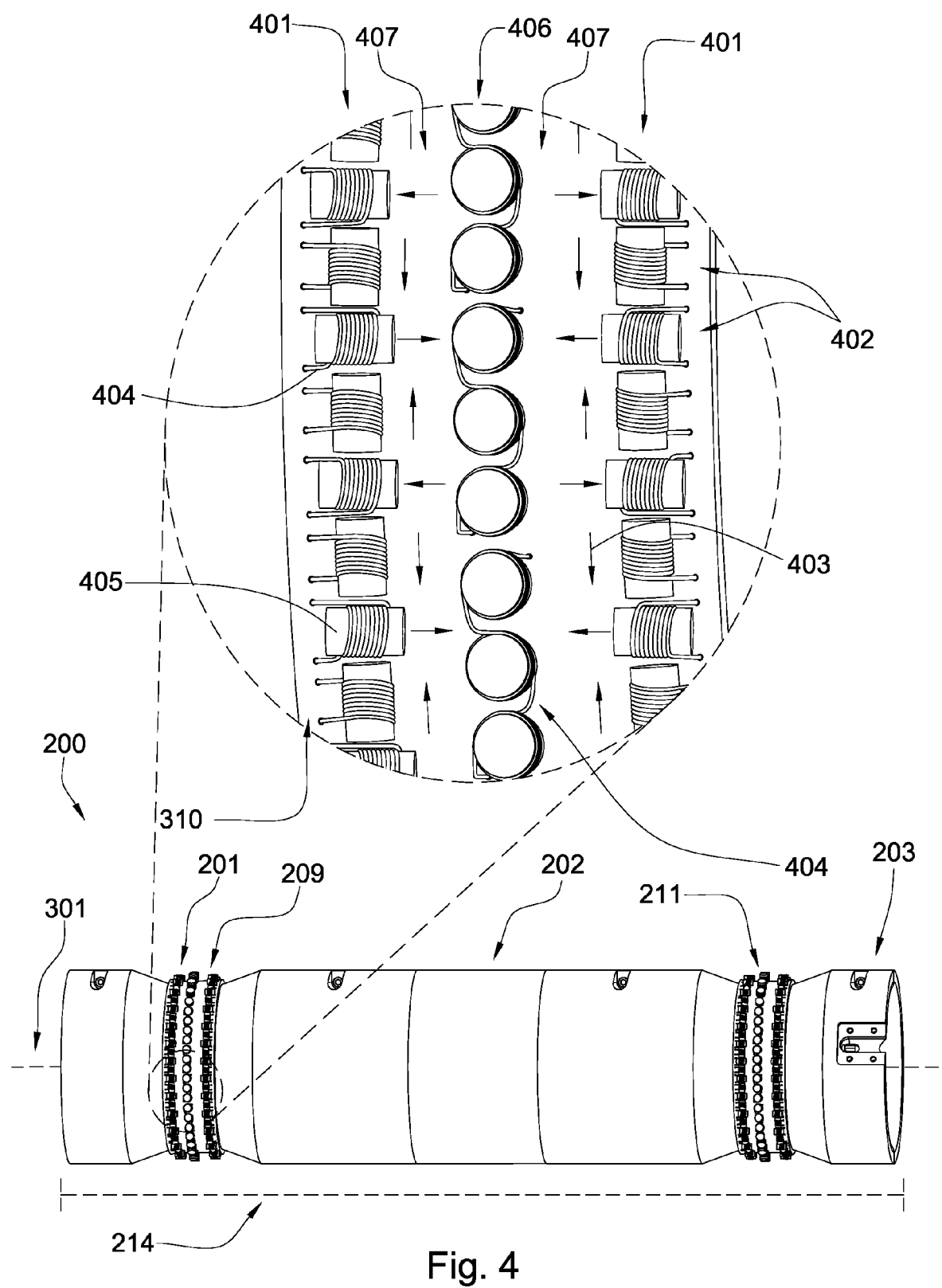
FIG. 4 is an orthogonal diagram of an embodiment of focusing array on a first portion.

Referring now to FIG. 4, the at least one focusing array 201 comprises two Halbach array 401 disposed on opposite sides of a central array 406. In some embodiments, each of the Halbach arrays 401 comprise an augmented field side 407 that is intermediate the Halbach array 401 and the central array 406. The focusing array 201 comprises a plurality of magnetic units 402. In this embodiment, the Halbach arrays 401 and the central array 406 each comprise a plurality of magnetic units 402. Each unit 402 comprises a magnetic field orientation 403. The at least one focusing array 201 also comprises a plurality of induction coils 404. Each of the plurality of induction coils 404 is wound about at least one magnetic core 405.

In the current embodiment, each core 405 with a coil 404 wound about it constitutes a magnetic unit 402. When alternating electrical current is passed through an induction coil 404, an alternating magnetic field may be generated that has a magnetic field orientation 403 specific to that magnetic unit 402. The magnetic field orientation may correlate with the direction from which the current originates in the coil 404 and the direction in which the coil 404 is wound about the magnetic core 405. A Halbach array 401 may be created by placing orthogonal magnetic field orientations 403 adjacent to one another as demonstrated in FIG. 4. The magnetic units 402 of the central array 406 each comprise a magnetic field orientation 403 that is directed radially outward from the central axis 301 of the first portion 203.

It is believed that the combination of a radially outward-directed central array 406 disposed intermediate two opposing and inwardly directed Halbach arrays 401 may form the augmented magnetic field 213 of the focusing array 201 when alternating electric current is passed through the arrays 401, 406. The first portion 203 comprises a longitudinal length 214 that may be less than 18 feet. The longitudinal length 214 of the first portion 203 may inversely correlate with a strength of the shielding effect of the augmented magnetic field 213 generated by the focusing array 201. The first portion 203 in FIG. 4 also comprises a plurality of radial recesses 408 in the outer diameter 207 of the tool string 31. The first and second focusing arrays 209, 211 are each disposed within at least one radial recess 408.

Figure 5:
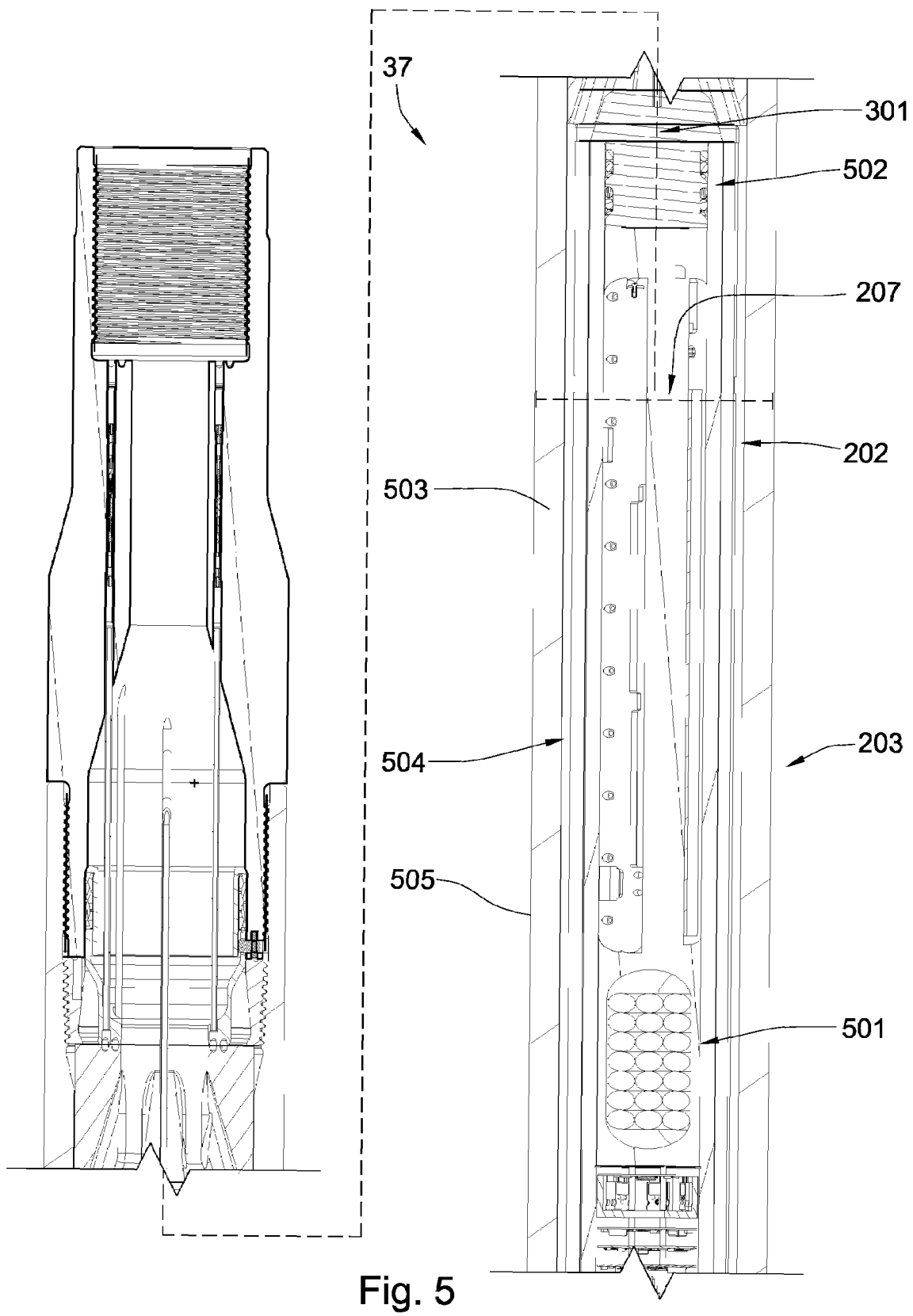
FIG. 5 is a cross-sectional diagram of an embodiment of a sensor.

Referring now to FIG. 5, an embodiment of the at least one sensor 202 disposed within an outer diameter 207 of the tool string 31 is disclosed. In the current embodiment the sensor 202 is disposed in the center of a tool string component 36. A pipe wall 503 surrounds the sensor 202 and a plurality of mud flow channels 504 is disposed intermediate the sensor 202 and the pipe wall 503. In some embodiments the sensor 202 may be disposed in a cavity disposed within the pipe wall 503, or in an annual radial recess disposed on an outer surface 505 of the pipe wall 503 The sensor 202 comprises a magnetometer 501 and an accelerometer 502 and is disposed in the center of the first portion 203 and close to the central axis 301 of the tool string 31. The sensor 202 may comprise at least one magnetometer, fluxgate magnetometer, scalar magnetometer, vector magnetometer, superconducting quantum interference device, magnetograph, rotating coil magnetometer, hall effect magnetometer, proton precession magnetometer, Overhauser magnetometer, Cesium vapor magnetometer, Spin-exchange-relaxation-free atomic magnetometer, or combinations thereof. In some embodiments the sensor 202 may comprise three orthogonal vector magnetometers.

Figure 6:
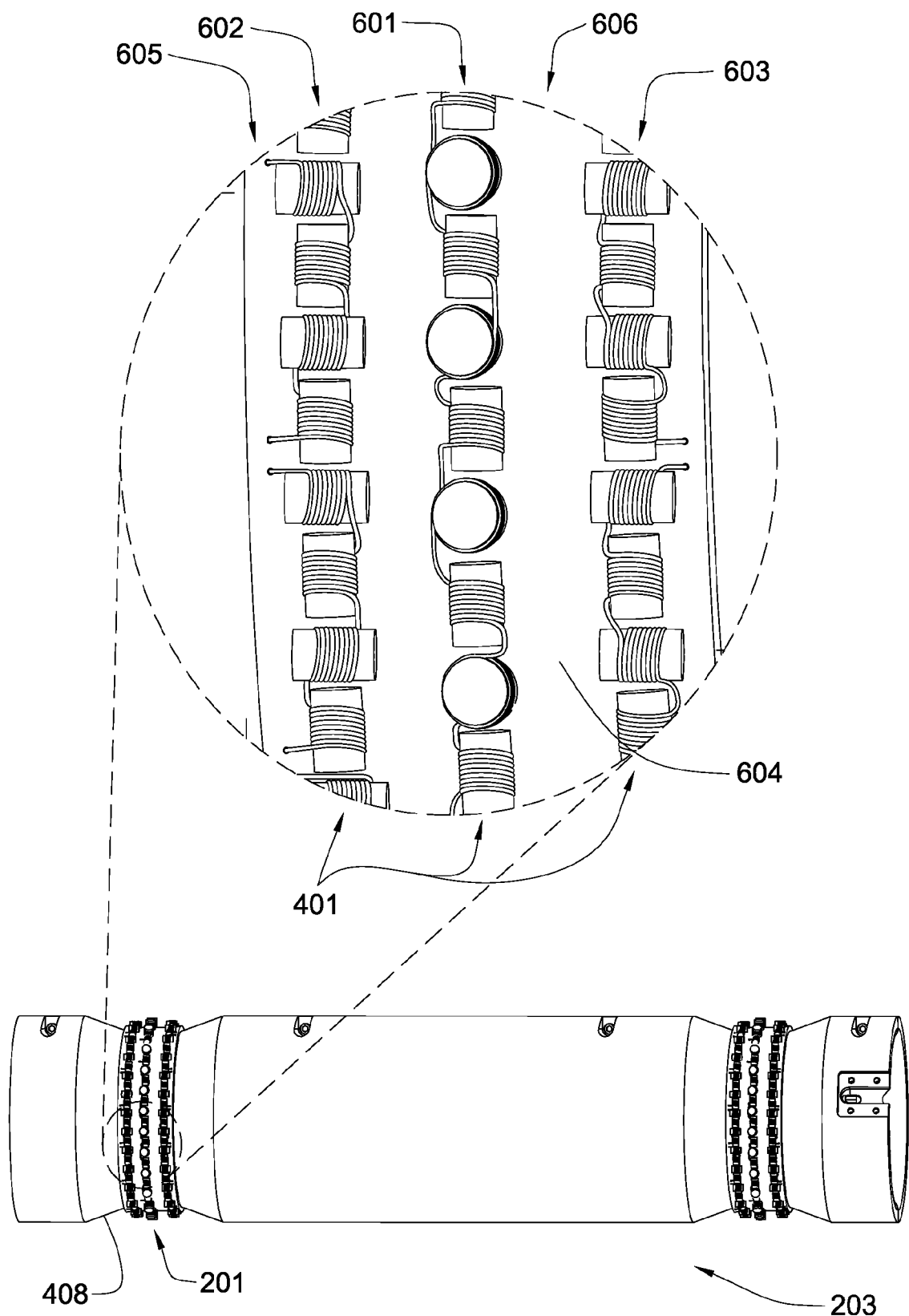
FIG. 6 is an orthogonal diagram of another embodiment of focusing array.

FIG. 6 discloses an embodiment of a focusing array 201 comprising three Halbach arrays 401. A radially-outward directed Halbach array 601 is disposed intermediate first and second Halbach arrays 602, 603. The radially-outward directed Halbach array 601 is disposed intermediate its own augmented magnetic side and a surface 604 of the first portion 203. The first Halbach array 602 is disposed intermediate the first array's augmented magnetic side 605 and the radially-outward directed Halbach array 601. The second array's augmented field side 606 is disposed intermediate the second array 603 and the radially-outward directed Halbach array 601.

Figure 7:
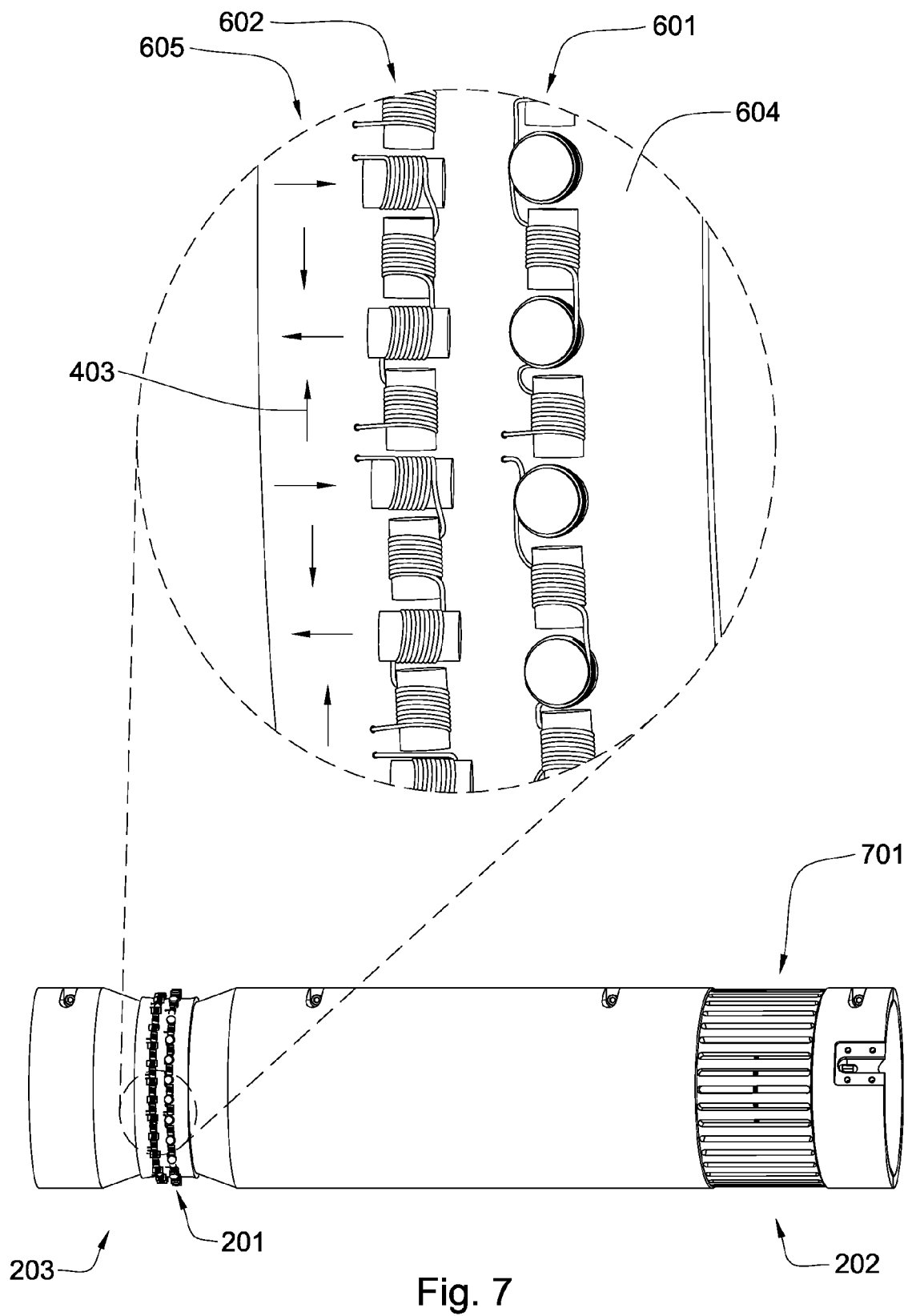
FIG. 7 is an orthogonal diagram of another embodiment of focusing array.

FIG. 7 discloses an embodiment of a first portion 203 comprising the at least one focusing array 201. The focusing array 201 comprises a first Halbach array 602 and a radially-outward directed Halbach array 601. The radially-outward directed Halbach array 601 is disposed intermediate the first portion's surface 604 and its own augmented field side. The first Halbach array 602 is disposed intermediate the first array's augmented magnetic side 605 and the radially-outward directed array 601. The first portion 203 comprises a sensor 202, which may be an inductive resistivity tool 701.

Figure 8:
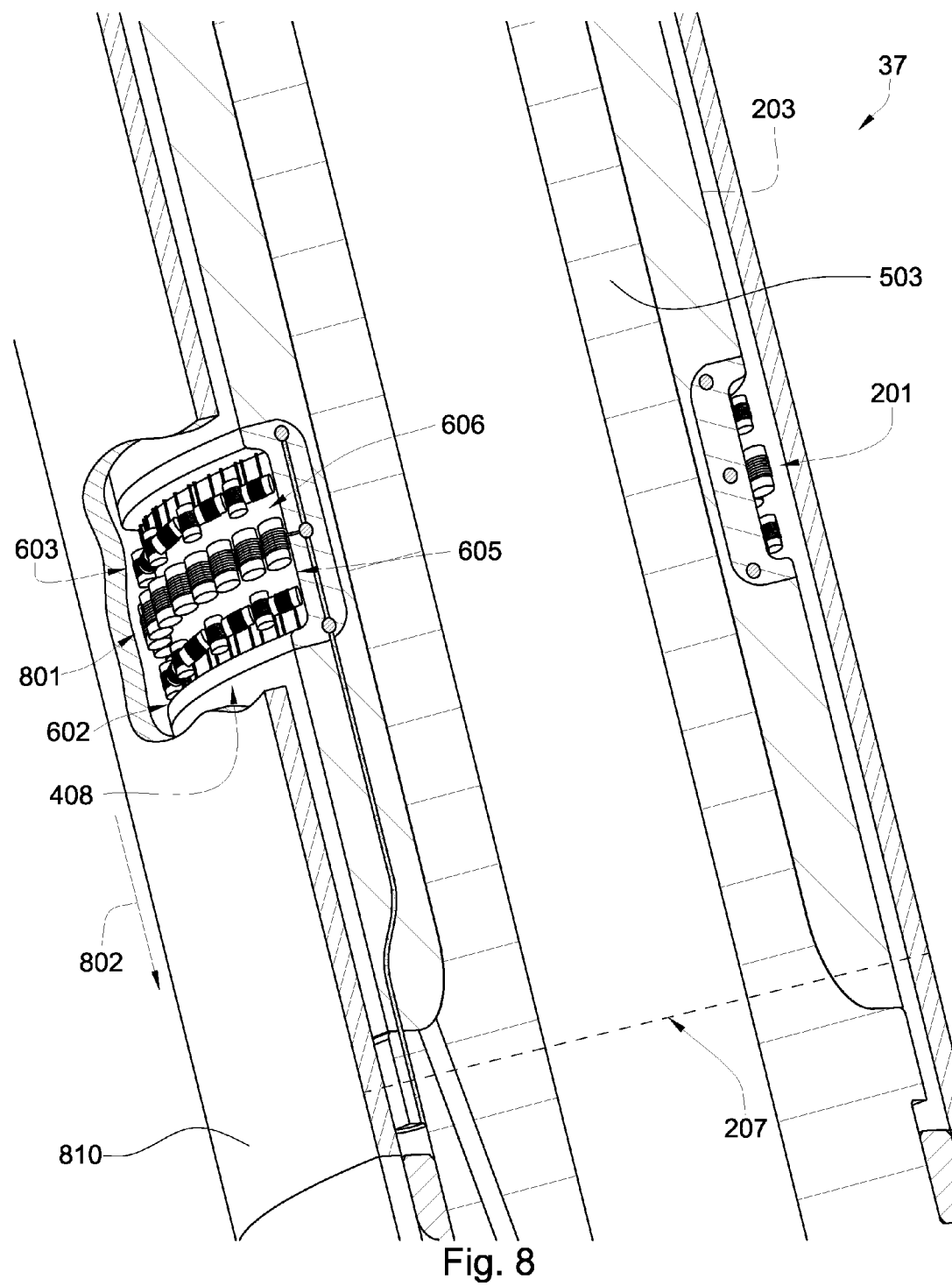
FIG. 8 is a perspective diagram of another embodiment of focusing array.

FIG. 8 discloses an embodiment of a downhole component 36 with a cover 810 that is partially removed in order to expose to view a longitudinal central array 801 that is disposed intermediate first and second Halbach arrays 602, 603. The longitudinal central array 801 is disposed in an annular radial recess 408 formed in the outer wall 503 of the downhole component 36. The longitudinal central array 801 may create an augmented magnetic field 213 pointing in a direction 802 away from a sensor 202 disposed on the first portion 203 of the tool string 31. The augmented magnetic field side 606 of the second Halbach array 603 may be disposed intermediate the second array 603 and the longitudinal central array 801 and may point in the direction 802 away from the sensor 202. The augmented magnetic field side 605 of the first Halbach array 602 may be disposed intermediate the first array 602 and the longitudinal central array 801. In some embodiments the first array 602 may be disposed intermediate its own augmented side 605 and the longitudinal array 801. A copper power line may provide electrical current to each of the arrays 801, 602, 603. In some embodiments each array 801, 602, 603 may receive electrical current through a separate copper power line.

Figure 9:
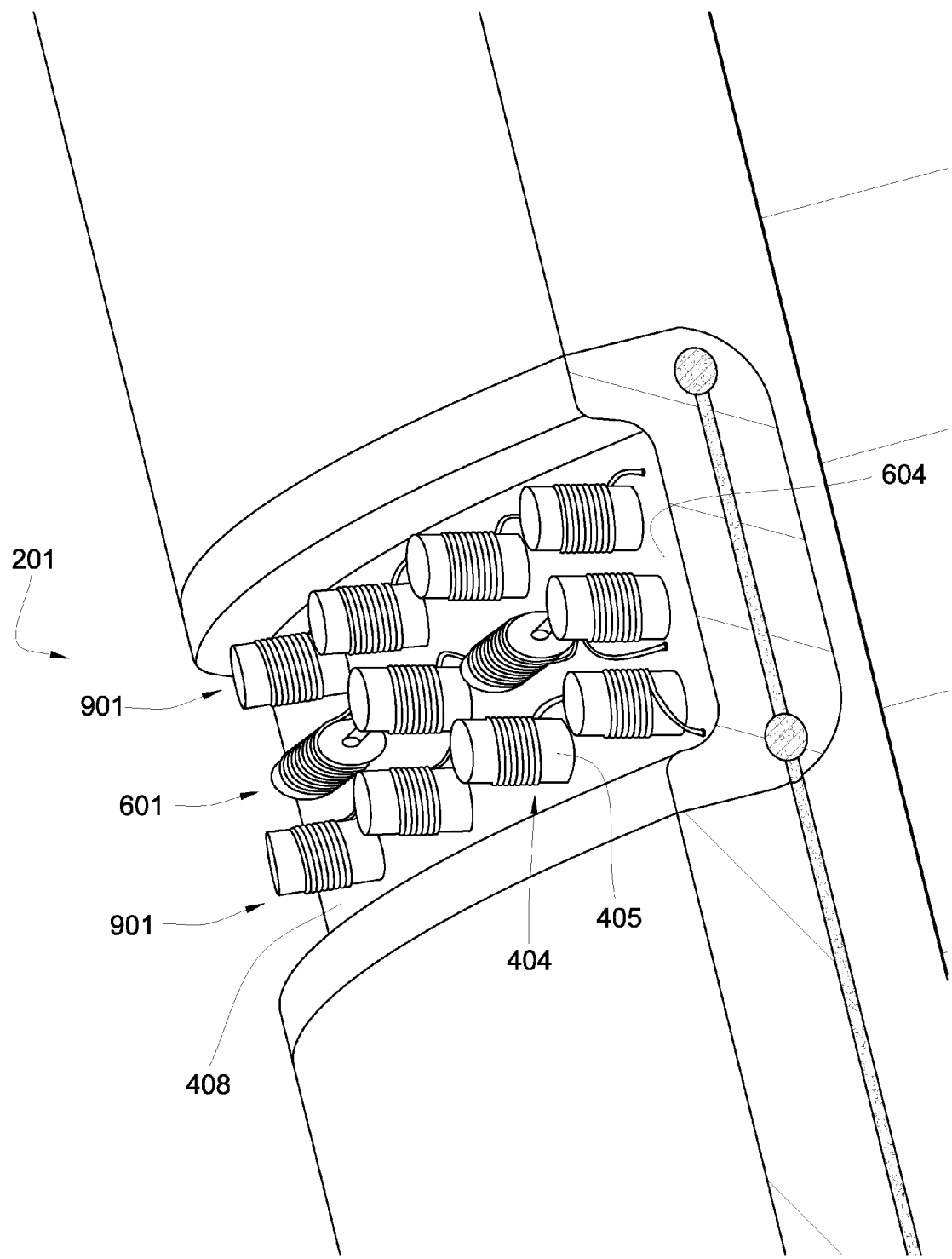
FIG. 9 is a perspective diagram of another embodiment of focusing array.
Figure 10:
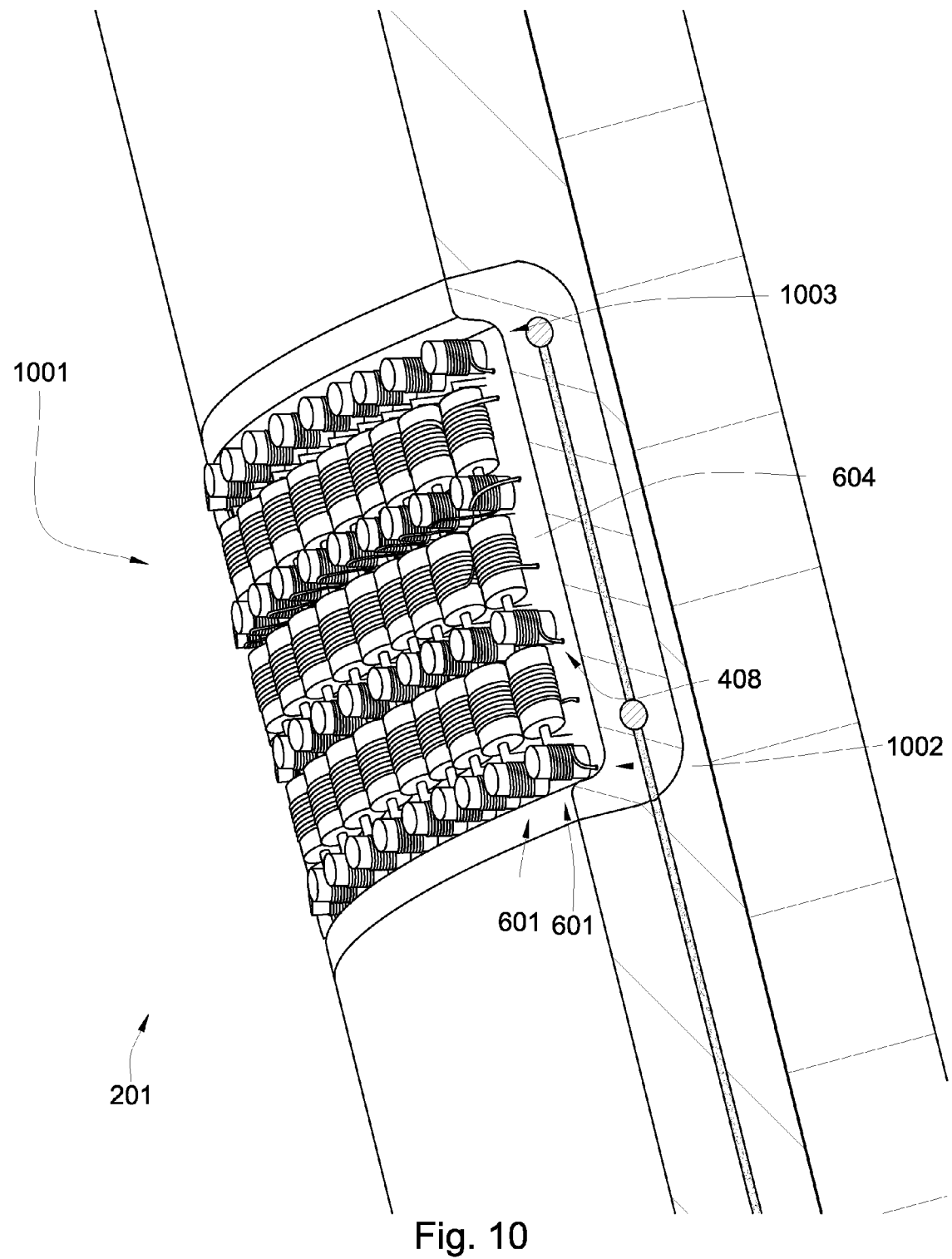
FIG. 10 is a perspective diagram of another embodiment of focusing array.

Referring now to FIG. 9, an embodiment of a focusing array 201 is disclosed in which a radially-outward directed Halbach array 601 is disposed in a radial recess 408 intermediate two bucking coil arrays 901. In FIG. 9 the radially-outward directed Halbach array 601 is concentric and coaxial with the tool string 31. Referring now to FIG. 10, the focusing array 201 comprises a Halbach central assembly 1001 that is concentric and coaxial with the tool string 31. The Halbach central assembly 1001 comprises a plurality of central Halbach arrays 601 that each extend from a first end 1002 of the radial recess 408 to a second end 1002 of the radial recess 408. Each radially-outward directed Halbach array 601 is disposed intermediate the array's own augmented magnetic side and the surface 604 of the first portion 203.

Figure 11:
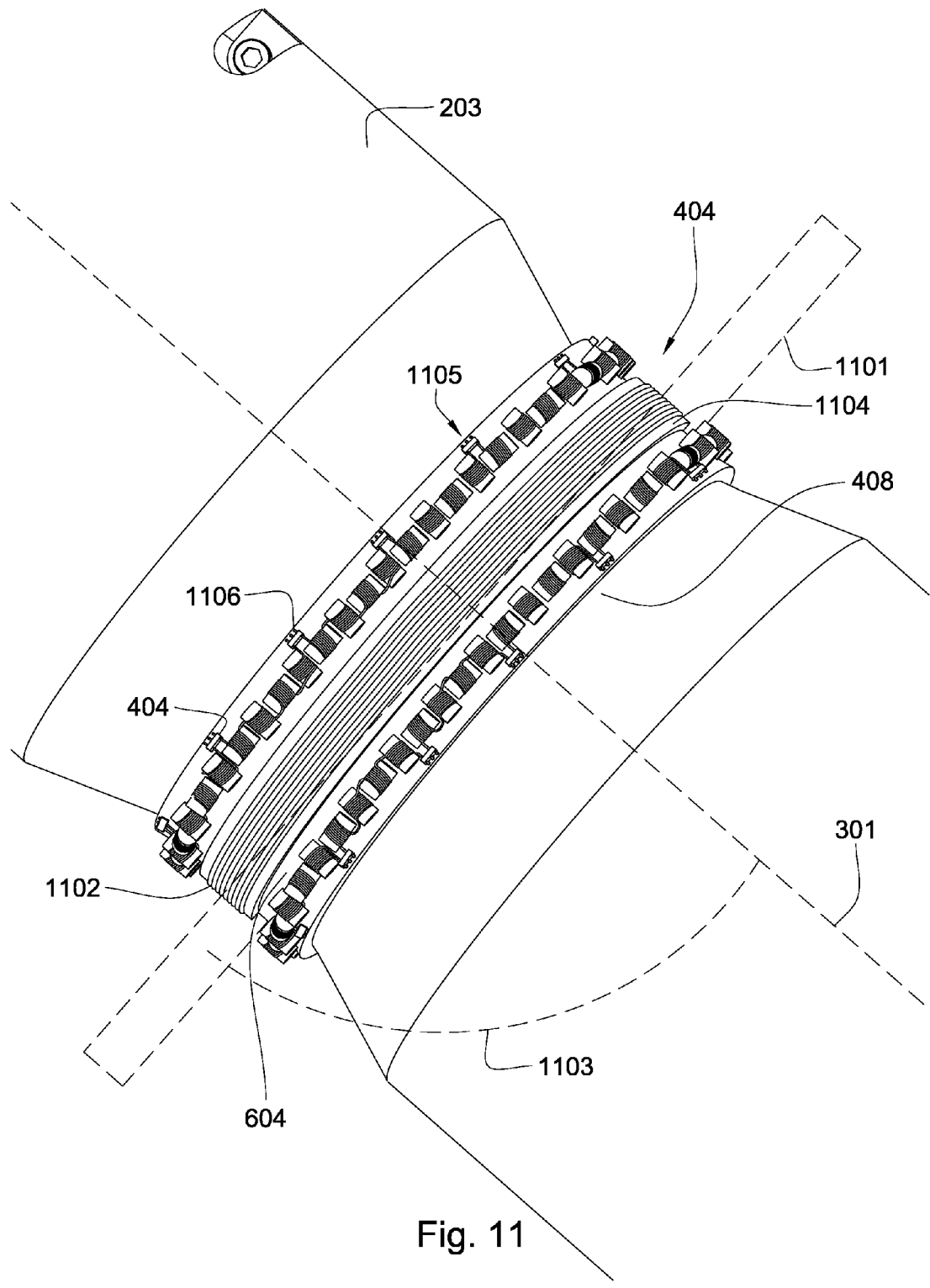
FIG. 11 is a perspective diagram of another embodiment of focusing array.

Referring now to FIG. 11, an induction coil 404 may comprise a plane 1101 that is generally defined by a first coil turn 1102 of the coil 404. The induction coil 404 may comprise between 1 and 60 coil turns. In previous embodiments disclosed thus far in this application the plane 1101 may intersect the axis 301 of the first portion 203 at an angle 1103 that was approximately 90 degrees. In some embodiments of the invention angle 1103 may be between 0 and 90 degrees. Such tilting of the coil 404 may allow for the augmented magnetic field 213 to be directed to advantageously interact with earth's magnetic field proximate the tool string.

A ring 1104 of magnetically conductive and electrically insulating material may be disposed intermediate the induction coil 404 and the surface 604 of the first portion 203. The magnetically conductive material may comprise ferrite fibers, shavings, powder, crystals, or combinations thereof. In order to take advantage of highly magnetically permeable materials such as ferrite while reducing the risk of cracking the brittle material, a flexible assembly of ferrite segments may be formed in the shape of a ring. Flexible rings 1104 may be advantageous for ease of production and assembly of the assembly 200, as well as for durability in harsh downhole conditions.

Open space in the radial recess 408 around the coil 404 and ring 1104 may be filled with a potting material. The potting material may comprise a material selected from the group consisting of polymers, organic materials, thermoset polymers, vinyl, an aerogel composite, a synthetic binder, thermoplastic polymers, an epoxy, natural rubber, fiberglass, carbon fiber composite, polyurethane, silicon, a fluorinated polymer, grease, polytetrafluoroethylene, a perfluroroalkoxy compound, resin, soft iron, ferrite, a nickel alloy, a silicon iron alloy, a cobalt iron alloy, a mu-metal, a laminated mu-metal, barium, strontium, carbonate, samarium, cobalt, neodymium, boron, a metal oxide, ceramics, cermets, ceramic composites, rare earth metals, and combinations thereof.

FIG. 11 further discloses an embodiment of the invention in which adjacent induction coils 404 are adapted to switch between an electrically parallel connection and a connection in series. The sensor assembly 200 comprises at least one switch box 1105. The switch box 1105 is connected to the electrically conductive medium inside the first portion 203 by a plurality of copper wires 1106. Two of the adjacent induction coils 404 each also connect with the switch box 1105. The switch box comprises internal circuitry (not shown) that allows for a parallel or series connection between the adjacent coils 404. In a series connection an electrical circuit inside the switch box 1105 between the adjacent coils 404 may be closed, allowing current to pass from one adjacent coil 404 to another adjacent coil 404. When the electrical circuit (not shown) is opened, the two adjacent coils 404 would then comprise a parallel connection. A signal line may trigger the selection of which circuits to open or close inside the switch box 1105.

Formations may comprise varying characteristics depending on their composition. These characteristics may require the use of different voltages or frequencies to obtain logging information. Changes in voltage or frequency may be facilitated by the ability to change adjacent coils 404 between parallel and series connections. In some embodiments of the invention a signal alteration component (not shown) such as a voltage control oscillator (VCO) may be disposed between a power source and the switch box 1105.

Figure 12:
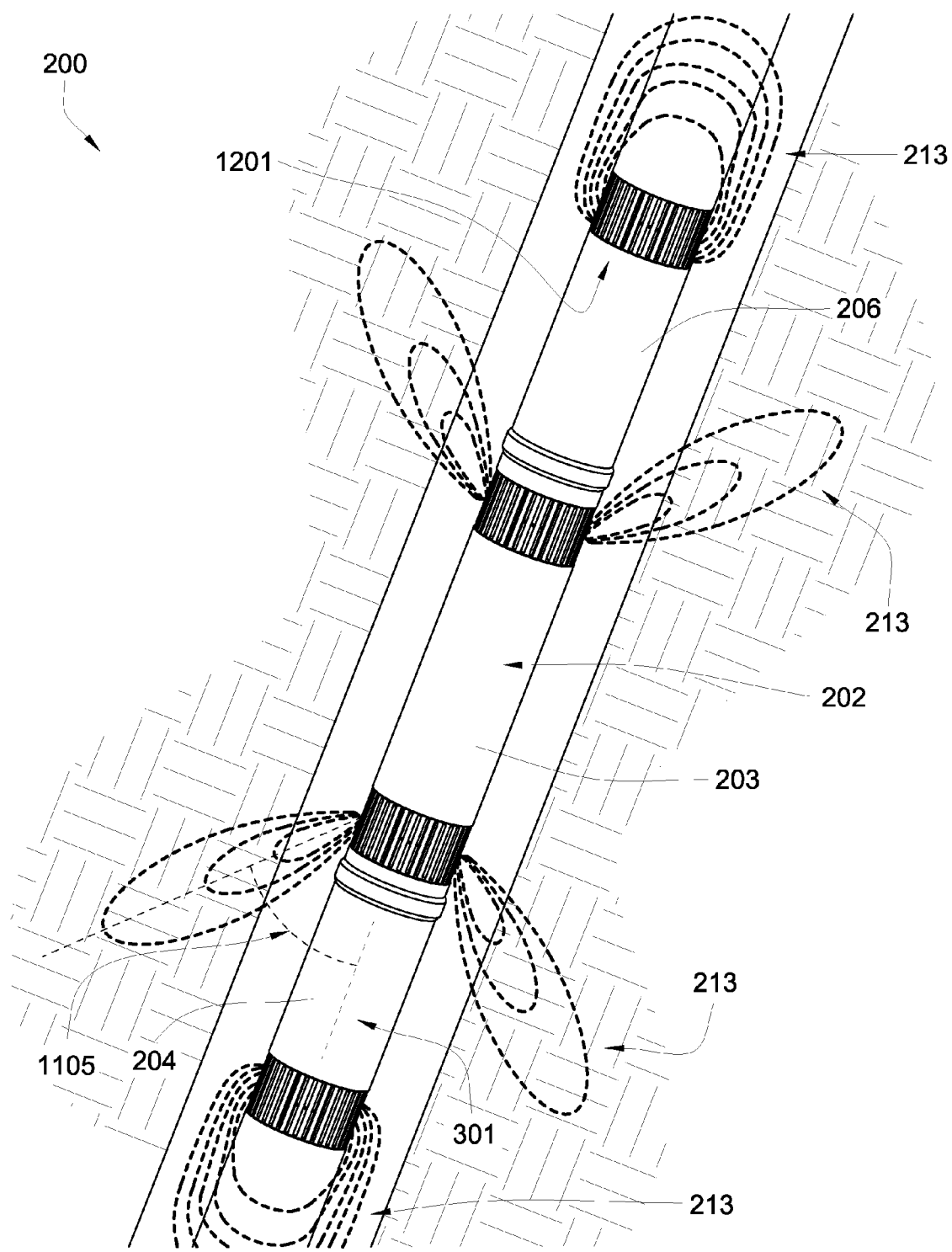
FIG. 12 is a perspective diagram of another embodiment of a sensor assembly.

Referring now to FIG. 12, an embodiment is disclosed in which at least one peripheral focusing array 1201 is disposed on the second portion 204 of the tool string 31. Although in the present embodiment the sensor assembly 200 also comprises first and second focusing arrays 209, 211 disposed on the first portion 203, in some embodiments the sensor assembly 200 may comprise a focusing array 1201 disposed on the second portion 204 with no focusing arrays 209, 211 disposed on the first portion. FIG. 12 also discloses first and second focusing arrays comprising an angle 1105 of approximately 45 degrees with the central axis 301 of the tool string 31. Peripheral focusing arrays 1201 comprise an angle 1105 with the central axis 301 of approximately 0 degrees. In some embodiments of the invention the first and second portions 203, 204 may be disposed on a single downhole component.

Figure 13:
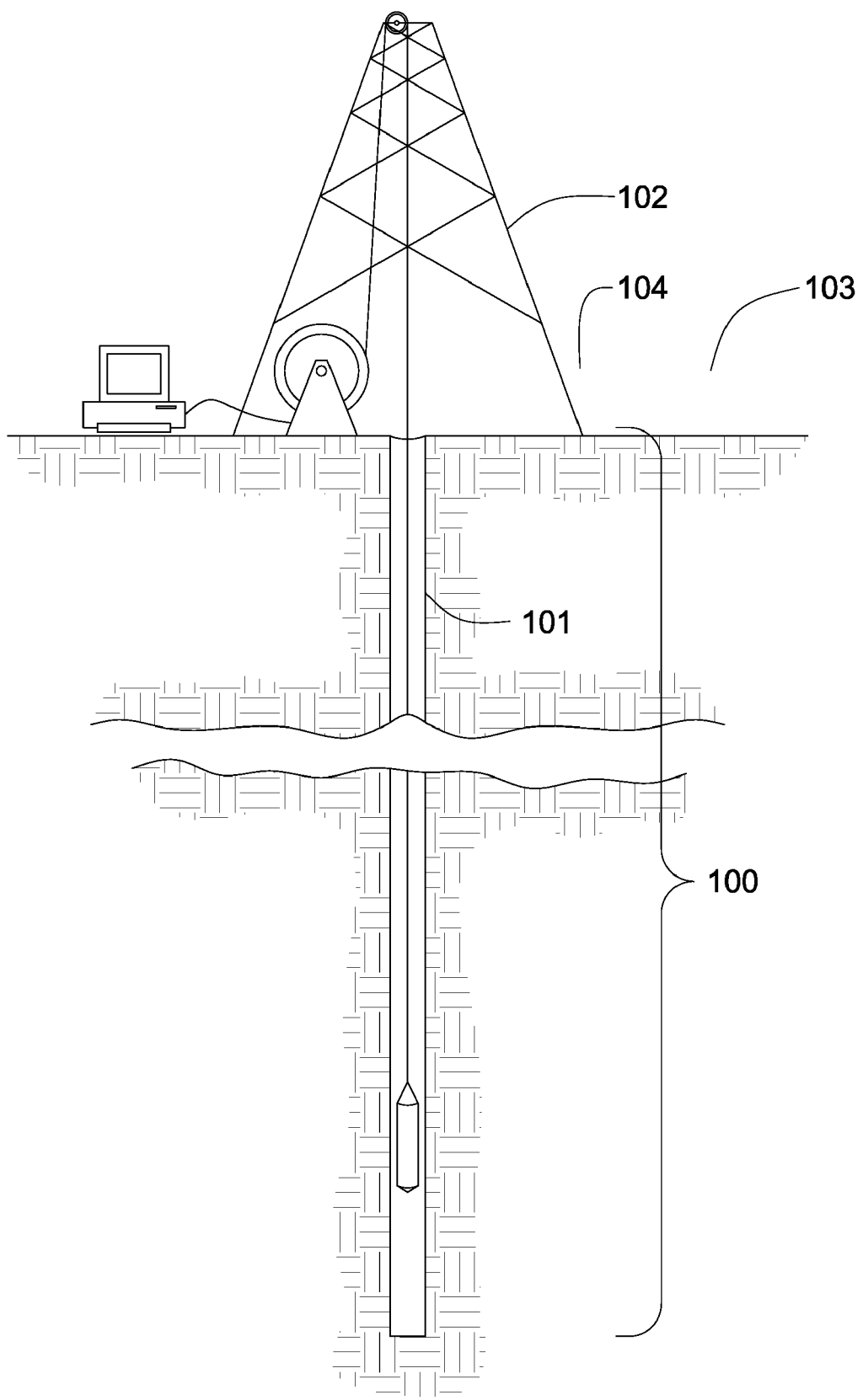
FIG. 13 is a perspective diagram of another embodiment of a sensor assembly.

FIG. 13 discloses a wireline tool in a well bore that may be equipped with a sensor assembly similar to the assembly described in FIG. 2.

Whereas the present invention has been described in particular relation to the drawings attached hereto, it should be understood that other and further modifications apart from those shown or suggested herein, may be made within the scope and spirit of the present invention.

What is claimed is:

1. A sensor assembly for incorporation into a downhole tool string, comprising:
   at least one sensor that detects changes in magnetic flux proximate a first portion of the downhole tool string;
   a second portion of the downhole tool string comprising a characteristic that interferes with a magnetic reading of the at least one sensor;
   at least one magnetic focusing array disposed on an outer diameter of the downhole tool string; and
   wherein the at least one magnetic focusing array reduces an effect on the sensor of the interfering characteristic of the second portion.

2. The sensor assembly of claim 1, wherein the at least one focusing array comprises a Halbach array.

3. The sensor assembly of claim 1, wherein the second portion comprises a magnetically conductive material and the first portion comprises a magnetically insulating material.

4. The sensor assembly of claim 1, wherein the first portion of the tool string is disposed intermediate the second portion and a third portion, and the assembly comprises a first focusing array disposed proximate a junction of the first and second portions, and a second focusing array disposed proximate a junction of the first and third portions.

5. The sensor assembly of claim 4, wherein the first and second focusing arrays each comprise a signal intensity that is adjustable.

6. The sensor assembly of claim 1, wherein the at least one focusing array comprises an augmented magnetic field.

7. The sensor assembly of claim 1, wherein the at least one focusing array comprises a plurality of magnetic units, each unit comprising a magnetic field orientation.

8. The sensor assembly of claim 1, wherein the focusing array comprises at least one induction coil.

9. The sensor assembly of claim 8, wherein a ring of magnetically conductive and electrically insulating material is disposed intermediate the at least one induction coil and an outer surface of the first portion.

10. The sensor assembly of claim 8, wherein the induction coil comprises between 1 and 60 coil turns.

11. The sensor assembly of claim 10, wherein a first coil turn of the induction coil generally defines a plane that intersects a central axis of the tool string at an angle between 0 and 90 degrees.

12. The sensor assembly of claim 1, wherein the at least one focusing array comprises a plurality of induction coils and each of the plurality of induction coils is wound about at least one magnetic core.

13. The sensor assembly of claim 12, wherein at least one of the plurality of induction coils is adapted to switch between a series and parallel connection with at least one other coil of the plurality of induction coils.

14. The sensor assembly of claim 1, wherein the sensor is disposed within the outer diameter of the tool string.

15. The sensor assembly of claim 1, wherein the sensor comprises three orthogonal vector magnetometers.

16. The sensor assembly of claim 1, wherein the focusing array is disposed in an annular radial recess in an outer diameter of the tool string.

17. The sensor assembly of claim 1, wherein at least one focusing array is disposed on the second portion of the tool string.

18. The sensor assembly of claim 1, wherein the sensor assembly is in communication with a downhole network.

19. The sensor assembly of claim 1, wherein a longitudinal length of the first portion is less than 18 feet.

20. A sensor assembly for incorporation into a wireline tool, comprising:
    at least one sensor that detects changes in magnetic flux proximate a first portion of the wireline tool;
    a second portion of the wireline tool comprising a characteristic that interferes with a magnetic reading of the at least one sensor;
    at least one magnetic focusing array disposed on an outer diameter of the wireline tool; and
    wherein the at least one magnetic focusing array reduces an effect on the sensor of the interfering characteristic of the second portion.

* * * * *